United States Patent [19]

Sarraf et al.

[11] Patent Number: 4,956,831
[45] Date of Patent: Sep. 11, 1990

[54] LOW ACOUSTIC NOISE HEAD ACTUATOR

[75] Inventors: Raymond E. Sarraf, Westminster; Daniel R. Zaharris, Longmont, both of Colo.

[73] Assignee: MiniScribe Corporation, Longmont, Colo.

[21] Appl. No.: 244,059

[22] Filed: Sep. 14, 1988

[51] Int. Cl.⁵ ............................................. G11B 21/10
[52] U.S. Cl. ................................. 369/32; 360/78.04; 360/78.06; 369/43
[58] Field of Search ........................... 369/32, 43–47; 358/907; 360/78.01, 78.04, 78.06

[56] References Cited

U.S. PATENT DOCUMENTS

| 4,398,228 | 8/1983 | Bauck | 360/77.02 |
| 4,495,608 | 1/1985 | Kimura | 369/33 |
| 4,600,868 | 7/1986 | Bryant | 318/567 |
| 4,615,023 | 9/1986 | Inada et al. | 369/44 X |
| 4,627,043 | 12/1986 | Uehara | 369/215 |
| 4,675,671 | 6/1987 | Ashbee et al. | 360/78.13 |

Primary Examiner—Robert L. Richardson
Attorney, Agent, or Firm—Curtis, Morris & Safford

[57] ABSTRACT

A disk drive system has a closed loop servo control system which is specially tuned for optimal deceleration during performance of a track access operation. The servo control system is returned in response to a track jump signal to perform a track jump operation at a lesser deceleration and thereby reduce low frequency acoustic noise produced by physical vibrations of the disk drive system. The returning of the servo control system is advantageously achieved by reducing the gain-bandwidth product of the closed loop within the servo control system.

14 Claims, 2 Drawing Sheets

LOW ACOUSTIC NOISE HEAD ACTUATOR

FIELD OF THE INVENTION

The present invention relates to disk drive systems and more particularly is related to the head actuator system within a disk drive system.

BACKGROUND OF THE INVENTION

In a hard or floppy disk drive system, a read/write head is moved across the disk so as to be positioned over a selected one of the large number of substantially circular, concentric tracks in which data is recorded and/or reproduced. The head is mounted on a head actuator so as to be positioned at the desired track and the head actuator in turn is driven by an actuator motor. The head actuator, together with other elements in the disk drive system, is mounted on a base plate for clockwise or counter-clockwise motion of the head across the disk.

One operation of the disk drive system is a track access operation or track seek operation in which the head is moved rapidly across a multiple number of tracks from an initial position to a desired track, so as to access the desired track for reading or writing data thereon. It is advantageous that this track access operation be completed as rapidly as possible, since no data recording or reproduction is accomplished during the period of the track access operation. The actuator motor is therefore controlled by a servo control system to achieve an optimum velocity trajectory (velocity-vs-distance) so as to complete the track access operation in the minimum period of time. The optimum trajectory generally requires the application of maximum acceleration to the head in an open-loop operation for an initial period of time until the head velocity and position intersect an optimal deceleration curve, and then the application of deceleration along the optimal deceleration curve for a final period of time to bring the head to rest over the desired track. Obviously, to minimize the initial period of time for the track access operation, the maximum acceleration should be as great as possible under open-loop conditions, and the actuator motor is advantageously a voice coil motor for this purpose. To further minimize the total time, the deceleration is performed under closed-loop conditions and the servo control system is specially tuned by the selection of its components to optimize the deceleration curve. The optimization is improved when a feed forward input is used in the closed loop servo control system.

A special case of the track access operation is the track jump operation in which the head is moved from one track to a closely adjacent track. It is the discovery of the present inventors that, during the track jump operation, the rapid succession of acceleration and deceleration in the specially tuned servo control system causes physical vibrations of the components within the disk drive system. These vibrations are transmitted to the base plate upon which the components, in particular the head actuator, are mounted, causing vibration of the base plate and, hence, low frequency acoustic noise. When a single track jump operation is performed, such acoustic noise, while undesirable, may be tolerated by the operator. However, when a series of track jumps are performed, for example when a disk is being formatted and the head is moved successively from one track to the next across the entire surface of the disk, or in a recalibration operation to find track 0, the regularly occurring acoustic noise becomes decidedly unpleasant. Indeed, depending upon the frequency of the acoustic noise and the structure of the disk drive system, resonance may occur which will not only increase the magnitude of the acoustic noise, but may also affect the physical configuration of the disk drive system and lead to errors in recording and/or reproduction.

SUMMARY AND OBJECTS OF THE INVENTION

It is therefore an object of the present invention to provide a disk drive system which avoids the above-described difficulties of the prior art.

It is another object of the present invention to provide a low acoustic noise servo control system within a disk drive system.

It is yet another object of the present invention to provide a closed loop servo control system which is tuned for optimal deceleration during a track access operation and is tuned for a lesser deceleration during a track jump operation so as to minimize the acoustic noise in both operations.

It is a further object of the present invention to reduce the gain-bandwidth product of the closed loop servo control system during a track jump operation so as to thereby minimize the acoustic noise.

In accordance with an aspect of the present invention, a disk drive system for recording and/or reproducing data on a disk in a plurality of substantially circular, concentric tracks comprises one or more heads for recording and/or reproducing the data in the track, a head actuator for positioning the head at a desired one of the tracks, an actuator motor for driving the head actuator, a mechanical mounting structure for mounting at least the head actuator, and a controller for generating either a track access signal or a track jump signal. The system further comprises servo control means for controlling the actuator motor to perform a track access operation in which the head is moved across a relatively large number of the tracks to reach the desired track in response to the track access signal and to perform a track jump operation in which the head is moved across a relatively small number of the tracks to reach the desired track in response to the track jump signal, and means for tuning the servo control means in response to the track jump signal. Advantageously, the means for tuning includes means for reducing the gain-bandwidth product of the servo control means in response to the track jump signal. The reducing means may reduce either the gain or the bandwidth of the servo control, or both.

In accordance with another aspect of the present invention, when the servo control means includes a feed forward input to the actuator motor, the reducing means may include a switch for disconnecting the feed forward input from the actuator motor in response to the track jump signal. Alternatively, or in addition thereto, the reducing means may include a gain-bandwidth circuit which reduces the gain-bandwidth product of the closed loop in which it is connected. The gain-bandwidth circuit may be connected into the servo control means in response to the track jump signal.

Furthermore, the servo control means advantageously includes a trajectory generator for generating trajectory signals for the track access and track jump operations, respectively, and the reducing means may respond to the track jump signal for controlling the generation of the track jump trajectory signal at a lower level than that of the track access trajectory signal. When a disk formatting operation includes a plurality of track jump signals, the reducing means reduces the gain-bandwidth product of the servo control in response to such disk formatting.

These and other objects, aspects and features of the present invention will become apparent from the following detailed description of a preferred embodiment of the present invention taken in connection with the accompanying drawings, throughout which like reference numerals denote like elements and claims.

DETAIL DESCRIPTION OF THE PREFERRED EMBODIMENT

Figure 1:
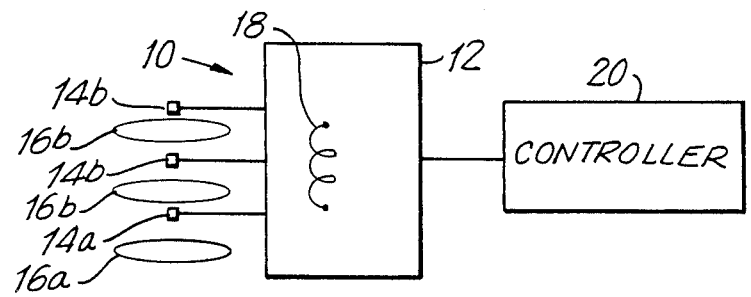
FIG. 1 is a schematic illustration of a hard disk drive system to which the present invention may advantageously be applied.
Figure 2:
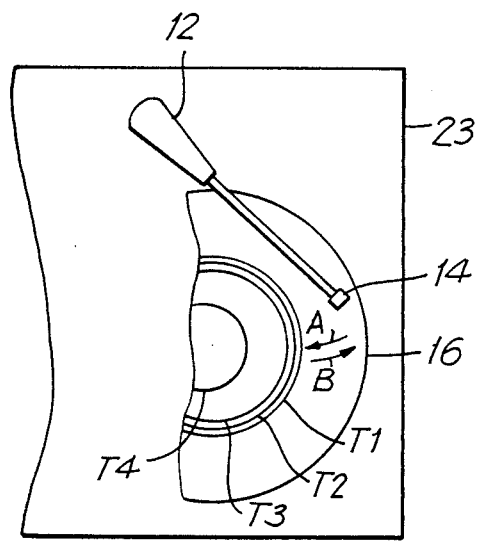
FIG. 2, is a top plan view of a hard disk usable in a hard disk drive system.

Turning now to the drawings and initially to FIGS. 1 and 2 thereof, the present invention may advantageously be applied to a conventional hard disk drive system 10. The following discussion will describe the present invention in the environment of such a hard disk drive system, but it will be understood that the present invention may also advantageously be applied to other disk drive systems, such as floppy or optical disk drive systems.

Hard disk drive system 10 includes a head actuator 12 on which is mounted a magnetic servo head 14a and one or more magnetic read/write heads 14b. Servo head 14a is adapted to read from a dedicated servo disk 16a, while read/write heads 14b are adapted to read from and/or write on respective surfaces of one or more hard disks 16b. As is conventional and illustrated in FIG. 2, each of disks 16b has a plurality of substantially circular, concentric data tracks, such as tracks T1, T2, T3, and T4. Heads 14b are ganged together to overlie corresponding tracks on the respective disks 16b and are positioned by positioning servo head 14a. Head actuator 12 includes a motor, such as a voice coil motor, schematically illustrated as coil 18 in FIG. 1, which supplies the driving power for moving head actuator 12 to position heads 14a, 14b over respective desired tracks on disks 16a, 16b. In accordance with known techniques, motor 18 is responsive to a driving current to rotate head actuator 12 in the clockwise and counter-clockwise directions to position heads 14a, 14b at the desired tracks. The following discussion will refer only to a single read/write head 14b and disk 16b, but it will be understood that all heads 14a, 14b are moved as a unit, for example in the track access or seek operation described below.

In a forward track access operation, head actuator 12 is driven by motor 18 to rotate in a clockwise direction as shown by arrow A in FIG. 2 to move head 14b from a position overlying, for example, track T1 to a position overlying, for example, track T4. In this forward track access operation, head 14 rapidly skips over the tracks in between, including tracks T2 and T3. In a corresponding reverse track access operation, head actuator 12 is driven by motor 18 to rotate in a counter-clockwise direction as indicated by arrow B to move head 14 from its position overlying track T4 to its position overlying track T1. Head actuator 12 is controlled to perform this track access operation in response to a track access signal $T_A$ supplied thereto from a controller 20 (FIG. 1). Controller 20 may be, for example, the computer control for disk drive system 10 and is responsive to a user request requiring access of a different track to generate track access signal $T_A$ supplied to motor 18 within head actuator 12. The track access signal $T_A$ will contain such information as the direction, clockwise or counter-clockwise, for movement of head actuator 12 and the number of tracks to be crossed to reach the desired track. A servo control system 22 in accordance with the present invention, as will be more fully described below in connection with FIGS. 4 and 5, generates and controls the driving current supplied to motor 18 so as to effectively move head 14b to overlie the desired track.

A desirable feature in disk drive system 10 is to complete the track access operation in a minimum amount of time. To this end, servo control system 22 advantageously operates in an open-loop configuration to apply maximum acceleration to head actuator 12 during an initial time period of the track access operation to reach a velocity on an optimal deceleration curve, described below. When the actuator motor is voice coil motor 18, this maximum acceleration is achieved by feeding as much current to voice coil motor 18 as possible. When the optimal deceleration curve is achieved, deceleration is applied in a closed-loop operation along the optimal deceleration curve to bring head 14b to the desired track as quickly as possible.

Figure 3:
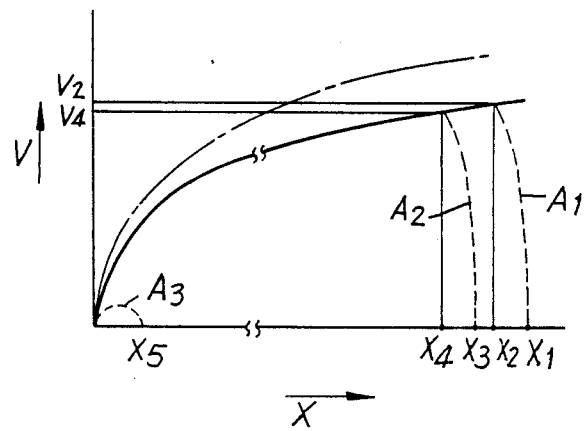
FIG. 3 is a phase plane plot of an optimal deceleration curve for track access and track jump operations.

FIG. 3 illustrates the trajectory of head 14b in a phase plane plot of velocity v. distance. The horizontal axis is the displacement x of head 14b in numbers of tracks from the desired track, which is taken at the origin. The initial track, where head 14b is at the start of the track access operation, is away from the origin. The vertical axis is the velocity V of head 14b. It will be noted that the same velocity-distance trajectory is followed for all track access operations skipping the same number of tracks, so that the trajectory for moving from track 100 to track 200 is the same as the trajectory for moving from track 150 to track 250, or from track 200 to track 100 in the opposite direction.

The optimal deceleration curve is shown in a solid line. This curve is calculated from the known parameters of disk drive 10 to minimize the time required to bring head 14b from any displacement to the origin. The parameters may be adjusted to optimize the deceleration curve, and so in accordance with the present invention servo control system 22 is tuned by the choice of components and their values for optimal closed-loop operation. This tuning takes into account such factors as the maximum deceleration which can be applied without physical stress and the need to bring head 14b to rest over the desired track. Advantageously a feed forward input is provided in the velocity control loop. Following any other deceleration curve, such as the one shown in dot-dash line in FIG. 3, will take more time to move head 14b from any track to the origin.

Thus, to move head 14b from $x_1$ to the origin, e.g. from track 100 to track 200, in the shortest amount of time, maximum acceleration is applied until the head's displacement-velocity curve $A_1$ intersects the optimal deceleration curve at velocity=$v_{22}$, displacement=$x_2$. Because the optimal deceleration curve is already known and stored in memory, servo control system 22 already knows for a 100 track jump what the intersection velocity $v_2$ will be, so in fact maximum acceleration in open loop operation will be applied until velocity $v_2$ is reached. Servo control system 22 does not need to know the current displacement or the elapsed time, but controls head 14b solely by knowing and adjusting its velocity. At the point of intersection, servo control system 22 switches into closed-loop operation to move head 14b along the optimal deceleration curve to the origin.

For a shorter track access operation, e.g. from track 100 to track 175, the initial position is at $x_3$. The same maximum acceleration is applied until the intersection of curve $A_2$ at velocity $v_4$, displacement=$x_4$ is reached, and then the same optimal deceleration curve is again followed to the origin.

It will be understood, of course, that the particular choice of components in servo control system 22, their values and their interconnections will depend upon the particular disk drive system 10. An important feature, however, in the proper tuning of servo control system 22 is the gain-bandwidth product of the system. The gain of the control loop in servo control system 22 is the ratio of the output signal to the input signal, which generally will depend on the frequency of the input signal. The bandwidth is the frequency at which the magnitude of the output signal drops 3dB down from the zero-frequency gain, and will in general be influenced by the noise filtering characteristics of the system. The bandwidth provides a measure of the transient response properties, in that a large bandwidth corresponds to a faster rise time, since higher frequency signals are passed onto the output. Conversely, if the bandwidth is small, only signals of relatively low frequencies are passed, and the time response will be slow and sluggish. The gain-bandwidth product, calculated by multiplying the gain of servo control system 22 by its bandwidth, is therefore a measure of the efficiency of the system. To optimize the deceleration curve, the gain-bandwidth product should be maximized, subject to other constraints not relevant to the present situation.

The special case of the track access operation is the track jump operation in which head 14b is moved from one track, for example track T1 (FIG. 2), to a closely adjacent track, such as track T2 or track T3. Controller 20 is responsive to a user request which requires a track jump operation to supply a track jump signal $T_J$ to head actuator 12 to cause the same to move head 14b in the track jump operation. Such track jump operations are used in, for example, the reading or writing of large portions of data in successive tracks, in finely adjusting the position of head 14b to a desired track in a recalibration operation, or in a disk formatting operation in which head 14b is moved successively from track to track across the surface of disk 16b to prepare disk 16c for the recording of data therein.

The dividing line between a track access operation and a track jump operation in number of tracks crossed is not fixed and depends on the particular disk drive system 10. It has been found by the present inventors that in short track jumps in the range of 1-10 tracks, the application of maximum acceleration followed closely by optimal deceleration causes sufficient physical vibrations of motor 18 and head actuator 12 to produce noticeable and annoying low frequency acoustic noise.

As illustrated in FIG. 2, the components of disk drive system 10, and in particular head actuator 12, are mounted on a base plate 23, formed of aluminum or other rigid material. The vibrations from head actuator 12 are transmitted to base plate 23 which then vibrates, producing the low frequency acoustic noise. Such low frequency acoustic noise is undesirable under any circumstances, even during the short period of a single track jump. When, however, disk 16 is being formatted to prepare it for the recording of data thereon, head 14 will be moved in a succession of track jumps across the entire surface of disk 16. The acoustic noise produced by servo control system 22 under these conditions is not only unpleasant, but may result in further physical distortion of the components of disk drive system 10 as they are shaken by the vibrations of base plate 23. Indeed, should the frequency of the acoustic noise correspond to a resonance frequency of disk drive system 10, the resultant physical vibrations may affect the operation of disk drive system 10 during recording and/or reproducing or other operations.

Therefore, in accordance with the present invention, servo control system 22 is retuned during the track jump operation so as to accommodate a lesser acceleration/deceleration without undue physical vibrations. In a preferred embodiment of the present invention, this retuning is achieved by reducing the gain-bandwidth product of servo control system 22. This may be achieved by reducing the gain, by reducing the bandwidth, or by reducing both. While this generally increases the time required for the track jump operation, it has been found that the elimination of any audible low frequency acoustic noise more than compensates for the increased duration of these relatively quick operations.

Figure 4:
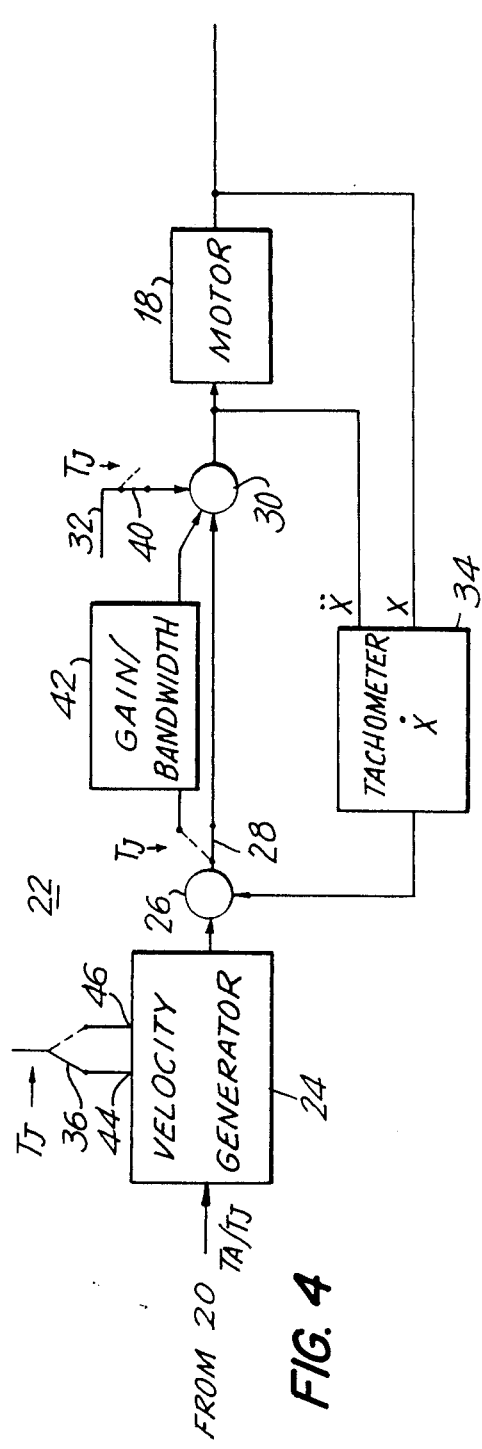
FIG. 4 is a block diagram of a preferred embodiment of the present invention.
Figure 5:
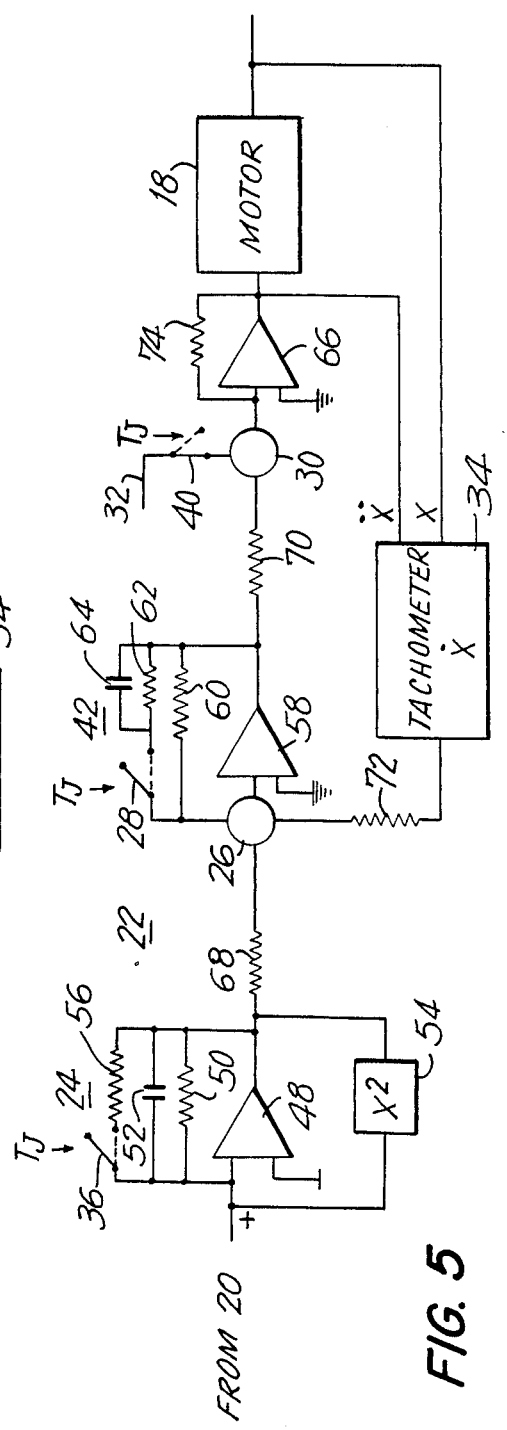
FIG. 5 is a circuit diagram of the embodiment of FIG. 4.

A first embodiment of servo control system 22 is illustrated in block diagram form in FIG. 4 and in circuit diagram form in FIG. 5. Referring first to FIG. 4, a trajectory generator 24 receives the track access signal $T_A$ or the track jump signal $T_J$ from controller 20 in dependence on whether track access or a track jump operation has been requested. Trajectory generator 24 is responsive to the received signal to generate the optimum trajectory signal for the requested operation. Since the number of tracks to be crossed and the optimal deceleration curve are known, the signal consists of an initial portion at a high level for a predetermined period (dependent only on the number of tracks) to provide maximum acceleration until the intersection velocity is reached, and then a predetermined portion (dependent only on the intersection velocity) following the optimal deceleration curve to the origin.

During a track jump operation, on the other hand, the nature of the optimum track jump trajectory will be changed, as discussed below, to reduce the physical vibrations and hence the acoustic noise. In particular, the level of the initial portion of the trajectory signal is reduced to reduce the applied acceleration, and then servo control system 22 is retuned to reduce the applied deceleration. While a reduction in the level of the trajectory signal for track jumps is known, the retuning of a servo control system is a novel and advantageous feature of the present invention. It has been found that this retuning provides a dramatic decrease in the level of acoustic noise and that the combination of retuning and reducing the level of the trajectory signal decreases the acoustic noise below audible levels in a normal working environment, providing a major improvement in the subjective working conditions.

The output signal of trajectory generator 24 is fed to a closed loop of servo control system 22. The closed loop includes in series a first summation network 26, a switch 28, a second summation network 30 and motor 18. A feed forward input 32 is also connected to summation network 30. A feedback loop is provided from the output of motor 18 through a tachometer 34 to summation network 26 so that the output of tachometer 34 is added to the output of trajectory generator 24. In the illustrated disk drive system 10 using a voice coil motor 18, it is well known that the acceleration produced by motor 18 is proportional to the magnitude of the current supplied thereto and that motor 18 acts as a double integrator. As a result, the output of motor 18 is a signal indicative of the position x of head actuator 12 (relative to its initial position). The input to motor 18 is a signal indicative of the acceleration x of head actuator 12, and this is also fed to tachometer 34, which uses the acceleration and position signals to generate a signal indicative of velocity x. This velocity signal is compared to the desired velocity along the optimal deceleration curve to control the acceleration/deceleration applied to head 14b through the feedback signal fed to summation network 26.

In the illustrated embodiment, servo control system 22 is retuned in response to track jump signal $T_J$ using three switches 36, 28 and 40 and a gain-bandwidth reducing circuit 42. The use of either of switches 28 (with circuit 42) or 40 will individually reduce the gain-bandwidth product of servo control system 22, but it is advantageous in the illustrated embodiment to use both and to use switch 36 to reduce the level of the trajectory signal. In FIGS. 4 and 5, the position of the switches 36, 28 and 40 in the absence of a track jump signal $T_J$ are illustrated in solid line, while the positions of the three switches in response to the track jump signal $T_J$ are illustrated in dashed line.

Switch 36 is responsive to track jump signal $T_J$ to activate one of two inputs 44, 46 controlling the operation of trajectory generator 24. When switch 36 activates input 44, trajectory generator 24 is adapted to produce the trajectory signal at a comparatively high level, for maximum acceleration. When switch 36 activates input 46 in response to track jump signal $T_J$, trajectory generator 24 outputs the trajectory signal at a relatively lower voltage level. This reduces the velocity command of servo control system 22. As shown in FIG. 3, the one-track trajectory curve $A_3$, in dotted line, starting from $x_5=1$ has an initial accelerating portion at an acceleration lower than the maximum acceleration provided for the track access operations starting from $x_1$ and $x_3$.

As shown in FIG. 5, trajectory generator 24 may be constructed using a first operational amplifier 48, a resistor 50 and a capacitor 52, all placed in parallel, with a feedback loop having a squaring circuit 54 to square the output and add the squared output back to the input. A second resistance 56 is placeable in parallel with the first resistance 50 by switch 36. In response to track jump signal $T_J$, switch 36 connects resistance 56 into the circuit. In accordance with known circuit principles, this decreases the gain of trajectory generator 24, thereby reducing the level of the trajectory signal and hence the level of acceleration.

Also, as illustrated in FIG. 4, switch 28 is operative in response to track jump signal $T_J$ to connect gain-bandwidth reducing circuit 42 in the closed loop of servo control system 22. The construction of gain-bandwidth reducing circuit 42 is chosen so as to reduce the gain-bandwidth product of the loop in which it is connected. It will be understood by those of ordinary skill in the art that another embodiment of the gain-bandwidth reducing circuit may be constituted by elements which are removed or disconnected from the closed loop in response to track jump signal $T_J$. A particular advantageous embodiment of gain-bandwidth reducing circuit 42 is illustrated in FIG. 5. More particularly, the closed loop of servo control system 22 is shown to include a first parallel connection of an operational amplifier 58 and a first resistance 60. A second parallel connection of a second resistance 62 and a capacitor 64 is provided. Normally, only operational amplifier 58 and resistance 60 are connected in parallel in the loop to tune servo control system 22 for optimal deceleration. However, in response to track jump signal $T_J$, switch 28 connects the parallel connection of resistance 62 and capacitor 64 in parallel with the parallel connection of operational amplifier 58 and resistance 60. Connecting capacitor 64 in the feedback loop of operational amplifier 58 reduces the bandwidth of servo control system 22. Connecting resistance 62 in the feedback loop reduces the gain.

Additionally, switch 40 is responsive to track jump signal $T_J$ to disconnect the feed forward input 32 from the servo control loop. This will reduce the bandwidth of servo control system 22.

Thus, the optimum trajectory for the track jump operation will never intersect the optimal deceleration curve (FIG. 3), thus reducing the applied deceleration as well as the applied acceleration.

Servo control system 22 is also illustrated in FIG. 5 as including additional components, including operational amplifier 66 and resistances 68, 70, 72 and 74. These additional components are used to tune servo control system 22 for maximum acceleration. It will also be understood that motor 18 includes additional elements besides the voice coil, including, for example, a power amplifier circuit.

The present invention has been described in connection with a preferred embodiment, but it will be understood by those of ordinary skill in the art that many modifications and changes may be made therein without departing from the spirit and scope of the present invention, which is to be determined by reference to the appended claims. For example, this invention may be used with a dedicated servo surface, as mentioned above, or with an embedded servo signal, known to those of ordinary skill in the art. Also, although it is preferred that the actuator be driven by a voice coil motor, as described, the basic teachings of the present invention are applicable to other actuator drive arrangements.

What is claimed is:

1. A disk drive system for recording and/or reproducing data on a disk in a plurality of substantially circular, concentric tracks, said system comprising:
   head means for recording and/or reproducing said data in said tracks;
   actuator means for positioning said head means at a desired one of said tracks;
   a mechanical mounting structure for mounting at least said actuator means;
   controller means for generating a selected one of a track access signal and a track jump signal;

closed loop servo control means having predetermined operating parameters for controlling said actuator means to respond to said track access signal to perform a track access operation in which said head means is moved across a relatively large number of said tracks to reach said desired track and to respond to said track jump signal to perform a track jump operation in which said head means is moved across a relatively small number of said tracks to reach said desired track; and means for modifying the operating parameters of said servo control means in response to said track jump signal.

2. A disk drive system according to claim 1; wherein said servo control means exhibits gain and bandwidth and said means for modifying includes means for reducing a gain-bandwidth product of said servo control means in response to said track jump signal.

3. A disk drive system according to claim 2; wherein said servo control means includes a feed forward input for supplying a feed forward signal to said actuator means and said reducing means includes switch means for removing said feed forward signal from said actuator means in response to said track jump signal.

4. A disk drive system according to claim 2; wherein said servo control means includes a closed loop, a gain-bandwidth reducing circuit, and switch means for connecting said gain-bandwidth reducing circuit in said closed loop in response to said track jump signal.

5. A disk drive system according to claim 4; wherein said closed loop includes a parallel combination of a first parallel connection of an operational amplifier and a first resistor and said gain-bandwidth reducing circuit includes a second parallel connection of a capacitor and a second resistor, and said switch means connects said second parallel connection in parallel with said first parallel connection in response to said track jump signal.

6. A disk drive system according to claim 2; wherein said servo control means includes trajectory generator means responsive to said track access signal and to said track jump signal, respectively, for generating first and second trajectory signals supplied to said actuator means for controlling the velocity thereof during track access and track jump operations, respectively, and wherein said reducing means includes switch means responsive to said track jump signal for causing said second trajectory signal to be generated at a level lower than that of said first trajectory signal.

7. A disk drive system according to claim 2; wherein said reducing means reduces the gain of said servo control means.

8. A disk drive system according to claim 2; wherein said reducing means reduces the bandwidth of said servo control means.

9. A disk drive system according to claim 2; wherein said reducing means reduces both the gain and the bandwidth of said servo control means.

10. A disk drive system according to claim 2; wherein said controller means generates a disk formatting signal including a plurality of said track jump signals, and wherein said reducing means reduces the gain-bandwidth product of said servo control means in response to said disk formatting signal.

11. In a disk drive system for recording and/or reproducing data on a disk in a plurality of substantially circular, concentric tracks, said system including a head for recording and/or reproducing said data in said tracks, a head actuator for positioning said head at a desired one of said tracks, a mechanical mounting structure upon which at least said head actuator is mounted, a controller for generating a selected one of a track access signal and a track jump signal and a closed loop servo control system exhibiting predetermined gain and predetermined bandwidth for controlling said actuator to perform a track access operation in which said head is moved across a relatively large number of said tracks to reach said desired track in response to said track access signal and to perform a track jump operation in which said head is moved across a relatively small number of said tracks to reach said desired track in response to said track jump signal; the improvement comprising:

means for reducing a gain-bandwidth product of said servo control system in response to said track jump signal, whereby acoustic noise generation is minimized.

12. A method of operating a disk drive system for recording and/or reproducing data on a disk in a plurality of substantially circular, concentric tracks, said system including a head for recording and/or reproducing said data in said tracks, an actuator for positioning said head at a desired one of said tracks, a mechanical mounting structure upon which at least said actuator is mounted, a controller for generating at least a track access signal and a track jump signal, and a closed loop servo control system having predetermined operating parameters for controlling said actuator; said method comprising the steps of:

controlling said actuator to perform a track access operation in which said head is moved across a relatively large number of said tracks to reach said desired track in response to said track access signal;

controlling said actuator to perform a track jump operation in which said head is moved across a relatively small number of said tracks to reach said desired track in response to said track jump signal; and modifying the operating parameters of said servo control system in response to said track jump signal to minimize acoustic noise during track jump operations.

13. A method according to claim 12; wherein said servo control system exhibits predetermined gain and a predetermined bandwidth, and said step of modifying includes reducing a gain-bandwidth product of said servo control system in response to said track jump signal.

14. In a method of operating a disk drive system for recording and/or reproducing data on a disk in a plurality of substantially circular, concentric tracks, said system including a head for recording and/or reproducing said date in said tracks, a head actuator for positioning said head at a desired one of said tracks, a mechanical mounting structure upon which at least said head actuator is mounted, a controller for generating a selected one of a track access signal and a track jump signal and a closed loop servo control system exhibiting predetermined gain and predetermined bandwidth for controlling said actuator to perform a track access operation in which said head is moved across a relatively large number of said tracks to reach said desired track in response to said track access signal and to perform a track jump operation in which said head is moved across a relatively small number of said tracks to reach said desired track in response to said track jump signal; the improvement comprising reducing a gain-bandwidth product of said servo control system in response to said track jump signal.

* * * * *